(12) United States Patent
Zhang

(10) Patent No.: US 7,787,448 B2
(45) Date of Patent: Aug. 31, 2010

(54) METHOD AND SYSTEM FOR TRANSPARENT TRANSPORT OF OPTICAL CHANNEL TRANSMISSION UNIT SIGNALS VIA AN OPTICAL TRANSPORT NETWORK

(75) Inventor: Jianmei Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 887 days.

(21) Appl. No.: 11/520,482

(22) Filed: Sep. 12, 2006

(65) Prior Publication Data

US 2007/0269218 A1    Nov. 22, 2007

(30) Foreign Application Priority Data

May 17, 2006    (CN) ......................... 2006 1 0080572

(51) Int. Cl.
*H04L 12/28* (2006.01)
(52) U.S. Cl. .................... 370/389; 370/505; 370/474; 370/503; 370/539; 370/466; 370/537; 370/299; 370/386; 370/498; 398/45; 398/68; 398/174
(58) Field of Classification Search .............. 398/58, 398/19, 179, 52, 33; 370/505, 539, 474, 370/503
See application file for complete search history.

(56) References Cited

U.S. PATENT DOCUMENTS

| | | | |
|---|---|---|---|
| 7,472,199 B1 * | 12/2008 | Rutherford et al. .......... | 709/233 |
| 2002/0018258 A1 * | 2/2002 | Schmitt et al. .............. | 359/118 |
| 2002/0027929 A1 * | 3/2002 | Eaves ......................... | 370/505 |
| 2003/0016416 A1 * | 1/2003 | Wolf .......................... | 359/139 |
| 2003/0048813 A1 * | 3/2003 | Lahav et al. ................. | 370/537 |
| 2004/0062277 A1 * | 4/2004 | Flavin et al. ................ | 370/474 |
| 2004/0151500 A1 * | 8/2004 | Misawa et al. ............... | 398/58 |

(Continued)

OTHER PUBLICATIONS

Non-Patent Literature G.709/Y.1331 "Interfaces for the Optical Transport Network" published by ITU-T on Mar. 2003. See whole Document.*

(Continued)

*Primary Examiner*—Hong Cho
*Assistant Examiner*—Yosief Berhane
(74) *Attorney, Agent, or Firm*—Townsend and Townsend and Crew LLP

(57) ABSTRACT

The present invention discloses a method and a system for transparent transport of optical channel transmission unit (OTU) signals via an optical transport network (OTN), which includes a transmitting unit and a receiving unit at the OTN network boundary: the transmitting unit converts an OTUj signal mapping entering the OTN network into OTUk signals of the current OTN network for transmission. In the mean time, it reserves the OTUj control overhead, or extracts the OTUj control overhead and transfers it to the reserved overhead location; the receiving unit receives the OTUk signals arriving at the OTN network boundary, and performs demapping and converting them into OTUj signals. In the mean time, it successively uses the aforementioned reserved OTUj control overhead, or extracts the aforementioned OTUj control overhead from the aforementioned reserved control overhead location for subsequent use, and transfers the OTUj signals from the current OTN network; the aforementioned j and k represent the rate rank of the aforementioned OTU, respectively. The present invention is capable of achieving total transparent transport of OTU signals, including a payload portion and a control overhead.

11 Claims, 8 Drawing Sheets

U.S. PATENT DOCUMENTS

| | | | | |
|---|---|---|---|---|
| 2004/0156325 | A1* | 8/2004 | Perkins et al. | 370/299 |
| 2005/0123294 | A1* | 6/2005 | Mascolo et al. | 398/19 |
| 2005/0286521 | A1* | 12/2005 | Chiang et al. | 370/389 |
| 2006/0104309 | A1* | 5/2006 | Vissers et al. | 370/474 |

OTHER PUBLICATIONS

G.709/Y.1331, published by ITU-T on Mar. 2003.*

* cited by examiner

METHOD AND SYSTEM FOR TRANSPARENT TRANSPORT OF OPTICAL CHANNEL TRANSMISSION UNIT SIGNALS VIA AN OPTICAL TRANSPORT NETWORK

CROSS-REFERENCES TO RELATED APPLICATIONS

This application claims priority to Chinese Patent Application No. 200610080572.0, filed May 17, 2006, commonly assigned, incorporated by reference herein for all purposes.

BACKGROUND OF THE INVENTION

The present invention relates to a communication signal transport technology, in particular, it relates to a method and a system for transport signals over an Optical Transport Network (OTN).

In the early 1990s, transport network evolved from a PDH network into a SDH network, which provided a large capacity synchronous transmission platform for voice operation and data operation. Currently, SDH network is facing the challenge of transitioning to an Optical Transport network (OTN) mode. The OTN network, as opposed to the SDH network, provides a transparent transport channel unrelated to customer operations, in addition to the large-capacity, multi-level management, enhanced foreword error correction functions. With service providers gradually accepting and deploying the OTN network, service providers are demanding OTN networks to provide open interfaces and achieve OTN equipment butt joint for multiple equipment providers. The service providers have already made the butt joint capability of an equipment manufacturer a first priority.

In real world applications, in addition to the OTN butt joint interface requirement, it also needs to provide transparent transport capability of OTN signals. Particularly in a network environment where there are multiple equipment manufacturers and multiple service providers, the different management domains are not yet fully exchangeable at all levels, or a trust relationship has not been established between the management domains. Therefore, the industry urgently demands an OTN network middle management domain for providing OTN signal transparent transport capabilities.

As a current technology, the proposed document OTN G.709 reveals an OTU signal transparent transport technology. This technology directly terminates the overhead of the relevant Operation, Administration, Maintenance and Provision (OAM&P) (that is, OTUj OAM&P, abbreviated as the control overhead) at the 3R point (namely, the management domain boundary point). Then, maps or multiplexes ODUj to OTUk (j<=k) signals of another management domain, extracts the ODUj signal from the OTUk signals in the management domain where OTUk signals belong, then re-inserts the OAM&P overhead related to the OTUj signals, and regenerates OTUj signals. The generation and stopping of the OTUk control overhead of the aforementioned OTUk signals are the location for formation and suspension of the OTUk, and the OTUk control overhead is used for segment communication and monitoring processing. Therefore, processing an OTUk control overhead is needed for generation and termination of each OTUk signal.

However, the drawbacks for the current technology are: only the ODUj signal in OTUj signals can be transparently transported; the OTUj related control overhead can not be transparently transported; total transparent transport of the OTU signals through the OTN network can not be realized.

BRIEF SUMMARY OF THE INVENTION

In view of this situation, the primary purpose of this invention is to provide two methods for transparent transport OTU signals via the OTN, which can achieve total transparent transport of OTU signals via the OTN network.

Another purpose of this invention is to provide a system for transparent transport OTU signals via the OTN, which can achieve total transparent transport of OTU signals via the OTN network.

In order to attain the aforementioned purpose, the primary technical proposal of the present invention is:

As one aspect of the present invention, the present invention provides a method for transparent transport of optical channel transmission unit (OTU) signals via an optical transport network (OTN) characterized by reserving an OTUj control overhead of OTUj signals entering an OTN network, and converting said OTUj signals mapping into OTUk signals of the current OTN network for transmission; when said OTUk signals arriving at a boundary of the current OTN network, demapping said OTUk signals and converting them to OTUj signals, continuously using said reserved OTUj control overhead as the OTUj control overhead for OTUj signals, and sending out OTUj signals from the OTN network; j and k represent a rate rank of said OTN signals, respectively, and j is smaller than k.

Preferably a detailed process of converting said OTUj signal mapping into the OTUk signals is: extending an ODUj signal of the OTUj signals, and extending the reserved OTUj overhead as a part of the ODUj signal, asynchronously mapping the extended ODUj signal to optical channel data branch unit signals, then multiplexing the multiple optical channel data branch unit signals to a payload area, generating an OTUk control overhead and an OTUk forward error correction (FEC) code, and assembling OTUk signals.

Preferably the detailed process of demapping and converting OTUk signals is: demultiplexing the optical channel data branch unit signals from the OTUk payload area, asynchronously demapping the optical channel data branch unit signals, obtaining the extended ODUj signals, using the reserved OTUj control overhead as the OTUj control overhead for OTUj signals, generating the FEC code, and assembling OTUj signals.

Preferably said OTUj control overhead is an Operation/Administration/Maintenance and Provision (OAM&P) overhead, including a Generic Communication Channel (GCC0) overhead and a Section Monitoring (SM) overhead.

As another aspect of the present invention, the present invention provides a system for transparent transport OTU signals through an OTN, that the system includes a transmitting unit and a receiving unit:

The transmitting unit is used for converting OTUj signals mapping entering the OTN network into OTUk signals of the current OTN network for transmission, in the mean time, reserving the original OTUj control overhead of said OTUj signals;

The receiving unit is used for receiving OTUk signals arriving in an OTN network boundary, then demapping and converting them to OTUj signals, in the mean time, successively using said reserved OTUj control overhead as the OTUj control overhead of the OTUj signals, and transporting said OTUj signals out of the current OTN network;

Said j and k represent a rate rank of said OUT signals, and j is smaller than k.

Preferably said OTUj control overhead is an OAM&P overhead, including a GCC0 overhead and an SM overhead.

As another aspect of the present invention, this invention provides a method for transparent transport of OTU signals through an OTN by extracting an OTUj control overhead of OTUj signals entering an OTN network, mapping said ODUj signals to OTUk signals of the current OTN network for transport, transferring said OTUj control overhead to a reserved overhead location; when said OTUk signals arriving at a current OTN network boundary, demapping said OTUk signals and converting them to said OTUj signals, extracting said OTUj control overhead from said reserved overhead location therein to be used as the OTUj control overhead of OTUj signals, and transmitting OTUj signals out from the current OTN network; j and k represent a rate rank of said OTU signals, respectively.

Preferably said j is smaller than k, and said reserved overhead location is: the reserved location for the ODUj overhead in said OTUj signals.

Preferably said j is smaller than k, and said reserved overhead location is: the reserved location for the ODUk overhead of said OTUk signals.

Preferably the reserved location of the ODUk overhead area carrying a branch OTUj control overhead, based on multiframe signal value differentiation.

Preferably the detailed process of mapping said ODUj signals to OTUk signals is: extending the ODUj signals, asynchronously mapping the extended ODUj signals to an optical channel data branch unit signal, then multiplexing a multiple optical channel data branch unit signals to a payload area of the OTUk, then generating an OTUk control overhead and a FEC code, and assembling the OTUk signals.

Preferably a specific mode for demapping and converting said OTUk signals is: demultiplexing the optical channel data branch unit signal from the OTUk payload area, asynchronously demapping this optical channel data branch unit signal, obtaining ODUj signals, and mapping them to OTUj signals, extracting said OTUj control overhead from said preserved overhead location as the OTUj control overhead of OTUj signals, generating the FEC code, and assembling OTUj signals.

Preferably said j is equal to k, said reserved overhead location is: the reserved location for ODUj overhead of said OTUj signal.

Preferably the detailed process for mapping said ODUj signals to OTUk signals is: mapping the ODUj signals to ODUk signals, generating an OTUk control overhead and a FEC code, and assembling the OTUk signals.

Preferably the specific mode for mapping said OTUk signals is: demapping ODUk signals of the OTUk to ODUj signals and mapping to the OTUj signals, extracting said OTUj control overhead from said reserved overhead location as the OTUj control overhead of OTUj signals, generating the FEC code, and assembling OTUj signals.

Preferably said further overhead processing is performed to the extracted OTUj control overhead, and said processing includes one kind or any combination from a bit wide conversion, a buffering, and a rate adaptation operation.

Preferably said OTUj control overhead is an OAM&P overhead, including a GCC0 overhead and an SM overhead.

As another aspect of the present invention, it also proposes a system for transparent transport of OTU signals through an OTN characterized in that this system includes a transmitting unit and a receiving unit:

The transmitting unit is used for mapping OTUj signals entering the OTN network to OTUk signals of the current OTN network for transmission, including a control overhead processing unit used for extracting an OTUj control overhead of said OTUj signals, and transferring that to the reserved overhead location;

The receiving unit is used for receiving OTUk signals arriving at an OTN network boundary, demapping and converting them into OTUj signals and transporting out of the current OTN network, which includes a control overhead processing unit, used for extracting said OTUj control overhead from said reserved overhead location as the OTUj control overhead of OTUj signals;

Said j and k are the rate of said OTU signals, respectively.

Preferably the control overhead processing unit in said transmitting unit includes:

An extracting unit, which is used for extracting the OTUj control overhead from said OTUj signals entered the OTN network;

A processing unit, which is used for overhead processing of said extracted OTUj control overhead;

An insertion unit, which is used for inserting the OTUj control overhead after overhead processing in said reserved overhead location.

Preferably the control overhead processing unit in said receiving unit includes:

An extracting unit, which is used for extracting the OTUj control overhead from said reserved overhead location;

A processing unit, which is used for overhead processing of said extracted OTUj control overhead;

An insertion unit, which is used for inserting the OTUj control overhead after overhead processing in the OTUj control overhead location of OTUj signals.

Preferably said j is smaller than k, said reserved overhead location is: the reserved location for the ODUj overhead of said OTUj signals.

Preferably said j is smaller than k, said reserved overhead location is: the reserved location for the ODUk overhead of said OTUk signals.

Preferably said j is equal to k, and said reserved overhead location is: the reserved location for the ODUj overhead of said OTUj signals.

Preferably said OTUj control overhead is an OAM&P overhead, including a GCC0 overhead and an SM overhead.

Compared to the existing technology, the beneficial effects of the present invention are:

Since the present invention reserves the control overhead of the OTUj signals entering the OTN network during transparent transport of OTU signals in the OTN network, or extracts and inserts them to the reserved overhead location, and re-uses the reserved control overhead as the control overhead of the OTUj signals going out of the OTN network, through the OTUk signal carrying transport, or, extracts the control overhead from the aforementioned control overhead location and reuses as the control overhead of the aforementioned OTUj signals. Therefore, it has the capability of transparent transport of the payload portion of the OTU signal and the related control overhead of the OTU signal (namely, the OAM&P overhead), in order to achieve total transparent transport of OTU signals via the OTN network. The present invention is particularly applicable to the OTN network of cross-domain management OTN, for achieving signal exchange and transparent transport of the control overhead cross-OTN-administration-domain, ensuring smooth flow of OTN signal communications, and enhancing communication efficiency. For applications in cross administration domain transparent transport from a low rate to a high rate, and at uniform rate, it is possible to reserve the OTU overhead information waiting to be transported carried in the reserved overhead location of the ODU section, and realize total transparent transport of the OTU overhead. For inter-domain management applications from a low rate to a high rate, it is possible to reserve the OTU overhead directly, then perform transparent transport as a part of the ODU extension, to achieve simplicity.

DETAILED DESCRIPTION OF THE INVENTION

The present invention is described in further details with embodiments and drawings.

Figure 1:
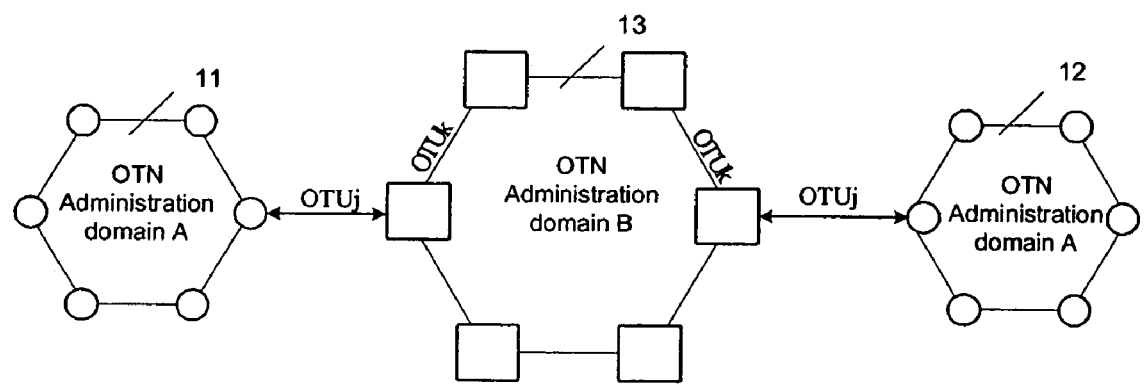
FIG. 1 is a schematic drawing of the case of application in OTN administration domain exchange.

The present invention is suitable for the case of signal transport process of the OTN network systems, and in particular, it is suitable for the case of multiple OTN administration domain exchanges. The following working examples are the cross-OTN-administration-domain application examples for explaining the present invention. As shown in FIG. 1, the OTN network in FIG. 1 includes two administration domains A and B (they are the OTN administration domain A and the OTN administration domain B in the diagram, respectively), two sub-networks 11 and 12 of the administration domain A are interconnected via the administration domain B13, and the administration domain A and the administration domain B might be the networks of two different service providers, and they also might belong to the same service provider using the networks from two different equipment providers. If it needs to transmit OTN signals, that is, the OTUj signals in the diagram, between two sub-networks 11 and 12 of the administration domain A through the administration domain B13, in other words, using the OTUj signals as the client operation signals of the administration domain B13, it needs to transmit OTUk signals through the administration domain B network. The present invention solves the problem of transparent transport of the aforementioned OTUj signals in the OTUk signals, including the payload portion and the optical channel data branch unit signal (OAM&P) overhead (abbreviated as the control overhead, and also called the OTU control overhead) portion.

Figure 2:
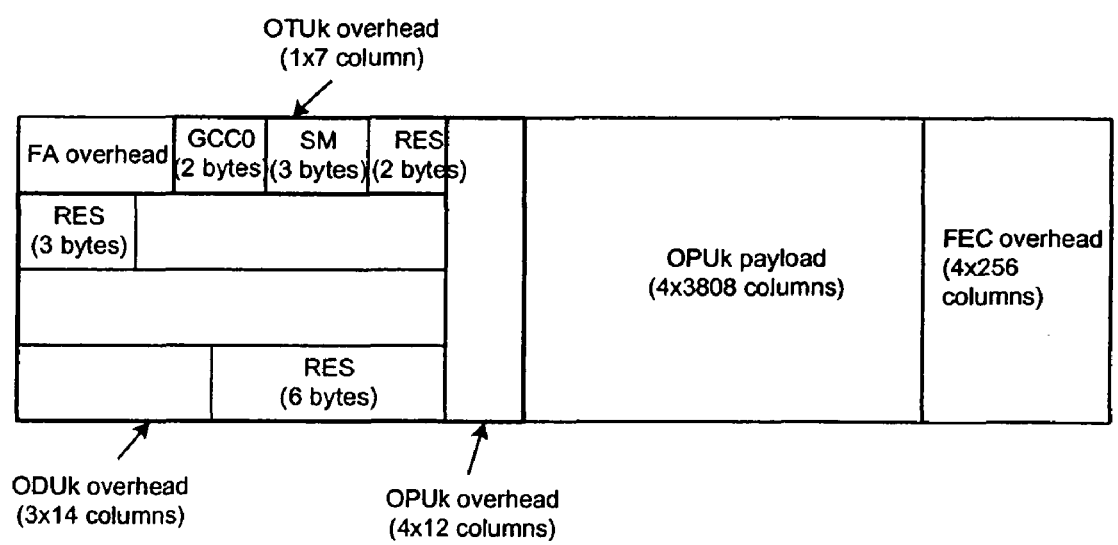
FIG. 2 is a schematic drawing of an OTU frame structure.

First, an OTU signal frame structure will be introduced. FIG. 2 is a schematic drawing of the OTU frame structure. As shown in FIG. 2:

The OTU frame (applicable to all OTN rate ranks including OTU1, OTU2, and OTU3, etc.) is a 4×4080 block byte structure, including 4×16 columns of the overhead area, 4×3808 columns of the optical channel payload unit (OPUk) payload area, and 4×256 columns of the forward error correction (FEC) area. The aforementioned 4×16 columns of the overhead area includes 1×7 columns of the optical channel transport unit (OTUk) overhead, 3×14 columns of the optical channel data unit (ODUk) overhead and 4×2 columns of the optical channel payload unit (OPUk) overhead area. The aforementioned k=1, 2, 3 corresponds to 2.5 G, 10 G, and 40 G rate ranks, respectively. The OTUk control overhead is the area in row 1 and columns 8~14. The current G.709 standard published an OTUk control overhead including 2 bytes of the Generic Communication Channel (GCC0) overhead and 3 bytes of the Section Monitoring (SM), and additionally including 2 bytes of reserved area. GCC0 is used for carrying communication data between networks, SM includes the OTUk section monitoring the needed connectivity monitoring, signal quality monitoring and return warning, etc. information, which is used for segment management, these two parts GCC0 and SM together are called the OTUk control overhead, which is the OAM&P overhead.

The present invention needs to resolve the issue of how to carry OTU signals (OTU frame) of one administration domain through the OTN network of another administration domain, including the payload portion and the control overhead. The aforementioned control overhead is the OAM&P overhead (including these two sections GCC0 and SM), and the aforementioned payload portion is the section other than the OAM&P overhead and the FEC area. For description convenience, refer to FIG. 1, the OTU frame of two different control overheads are defined as the OTUj and the OTUk frames (j and k may be the same or different), and the present invention needs to solve the problem of how to perform transparent transport by carrying OTUj frame control overhead by the OTUk frame.

The OTN signal transport method of the present invention is an improvement of the existing G.709 transparent transport technology. That is, during the process of transparent transport of the optical channel transport unit OTU signals cross-OTN-administration-domain, the OTUj control overhead of the OTUj signals entering the administration domain waiting for transparent transport is extended as a part of the optical channel data unit ODUj signals, the extended ODUj signals are mapped and converted to OTUk signals for cross administration domain transport, and demapping and converting the aforementioned OTUk signals at the direction exiting the administration domain. The OTUj control overhead in the extended ODUj signal, that will be the OTUj control overhead of the OTUj signals, is reassembled as the OTUj signal for transport. Or, extract the OTUj control overhead of the OTUj signals entering the administration domain waiting to be transparently transported, map and convert the aforementioned ODUj signals to OTUk signals of the current OTN network for transport, and the aforementioned OTUj control overhead is transferred to the reserved overhead location; when the aforementioned OTUk signals arrive to the current OTN network boundary, the OTUk signals are demapped and converted to OTUj signals, extract the aforementioned OTUj control overhead from the aforementioned reserved overhead location as the OTUj control overhead of the OTUj signals, and transport the OTUj signals out from the current OTN network. The j and k represent the rate rank of the aforementioned OTU signals, respectively.

The actual process procedure has the following three conditions. That is, these three conditions are that the OTUj frame rate is slower than the OTUk frame rate, the OTUj frame rate is equal to the OTUk frame rate, and the OTUj frame rate is higher than the OTUk frame rate. The aforementioned method of the present invention is primarily applied to the first two conditions. That is j<=k. As for the condition of j>k, the existing VCAT disclosed by G.709 for transparent transport of OTUj signals in a number of low rate OTUk signals can be adopted. Therefore, the method of the present invention resolves j<k and j=k two conditions, as introduced as follows.

Figure 3:
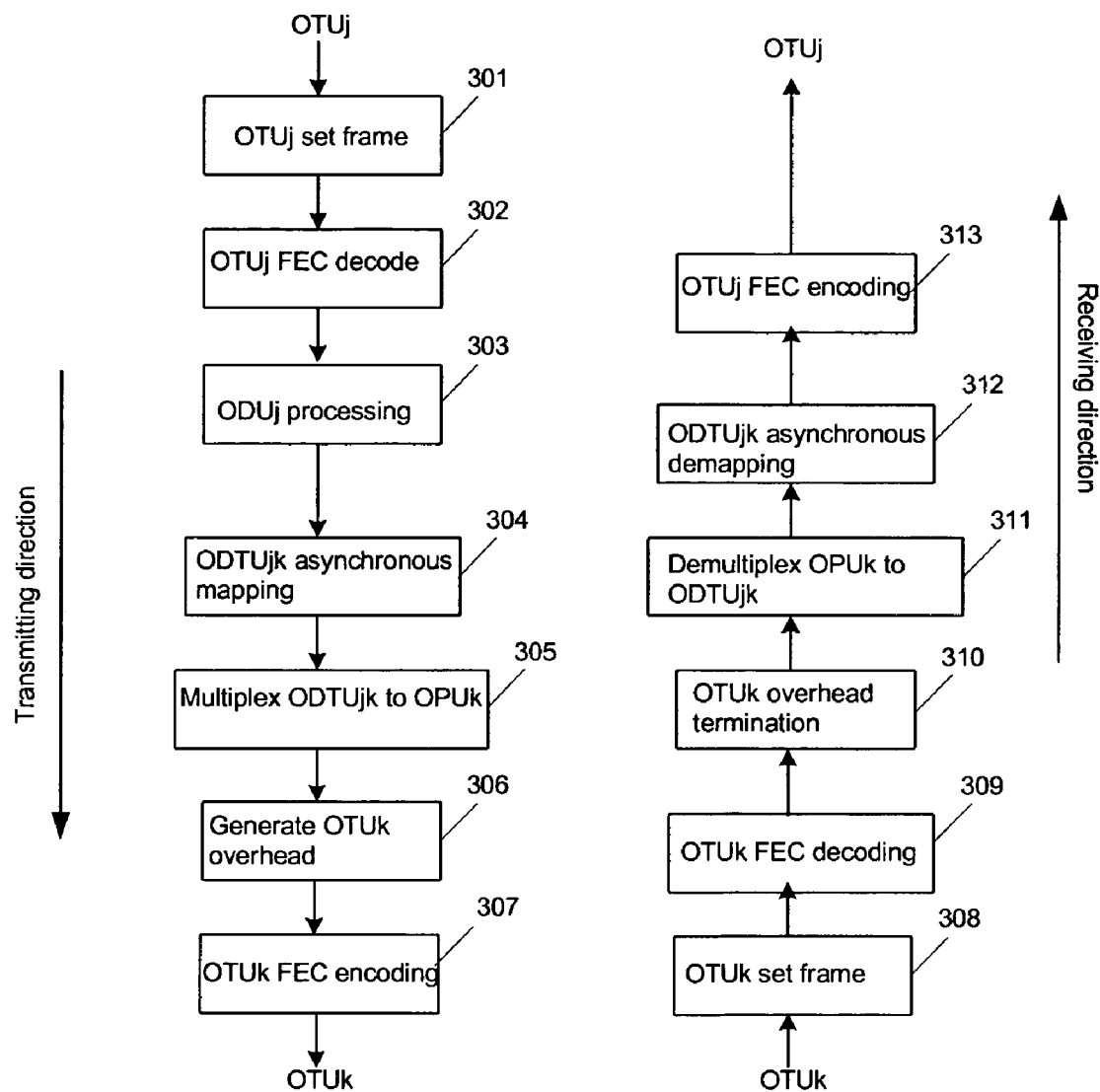
FIG. 3 is a flowchart of transparent transport of OTU signals cross-OTN-administration-domain mentioned in the 1$^{st}$ working example of the present invention.

The $1^{st}$ working example is a process procedure of multiplexing OTUj to the OTUk frame (j<k). FIG. 3 is a flowchart of transparent transport of OTU signals cross-OTN-administration-domain mentioned in the $1^{st}$ working example of the present invention. Refer to FIG. 3, in the transmitting direction, that is, the direction of the OTUj frame entering the administration domain B, it includes:

In step 301, perform the process of setting frame for the low rate frame, namely, the OTUj frame. That is, decide the initial position of the OTUj frame.

In step 302, decode the FEC of the OTUj frame, and perform error correction.

In step 303, reserve OTUj control overhead (namely, do not terminate the OTUj control overhead), extend the ODUj signal. The aforementioned extension operation only performs adding the FA overhead process, and the reserved OTUj control overhead is directly extended as a part of the ODUj signal. That is, do not terminate the OTUj control overhead area, and preserve the original value.

In step 304, asynchronously map the extended ODUj signals to an optical channel data branch unit (ODTUjk) signal, for adaptation of the frequency differences of different administration domains, in order to synchronize the clock of the ODTUjk branch signal and the OTUk signal of the administration domain B.

In step 305, multiplex a number of ODTUjk branch signals to an OPUk payload area of the OTUk frame.

In step 306, generate the OTUk control overhead of the OTUk frame.

In step 307, generate the FEC code of the OTUk layer in the OTUk frame, and finally assemble the OTUk frame.

After undergoing the aforementioned process, a number of low speed OTUj frames may be multiplexed to a higher speed OTUk frame, and then perform transparent transport in the administration domain B.

In the receiving direction, namely, the direction of exiting the administration domain B, the method of asynchronous demultiplexing the aforementioned OTUk frame to the OTUj frame in the present invention is:

In step 308, set frame for the OTUk frame.

In step 309, decode the FEC of the OTUk frame, and perform error correction.

In step 310, terminate the OTUk control overhead, namely, extract and process the OTUk control overhead.

In step 311, demultiplex the OPUk payload area of the OTUk frame, and obtain a number of ODTUjk branch signals.

In step 312, asynchronously demap the ODTUjk branch signals, respectively, and obtain the ODUj signals which are clock synchronized with the OTUj signals in the administration domain A.

In step 313, successively use the preserved OTUj control overhead in the extended ODUj signals as the OTUj control overhead of the OTUj frame, generate FEC code for the OTUj frame, add to the corresponding area, form a complete OTUj frame structure, and transport to the administration domain A.

The aforementioned process enables realization of transparent transport of low speed OTUj frame of the administration domain A through the administration domain B. Namely, it enables transparent transport of the OTUj control overhead and the payload portion.

In the aforementioned $1^{st}$ working example, during the actual circuit design, it only needs to terminate the OTUj control overhead of the existing transmitting direction, without processing the regenerating module bypass of the OTUj control overhead in the receiving direction, and the ODUj extended module only needs to add the FA overhead without processing the fixed stuffing of the OTUj control overhead area.

Figure 4:
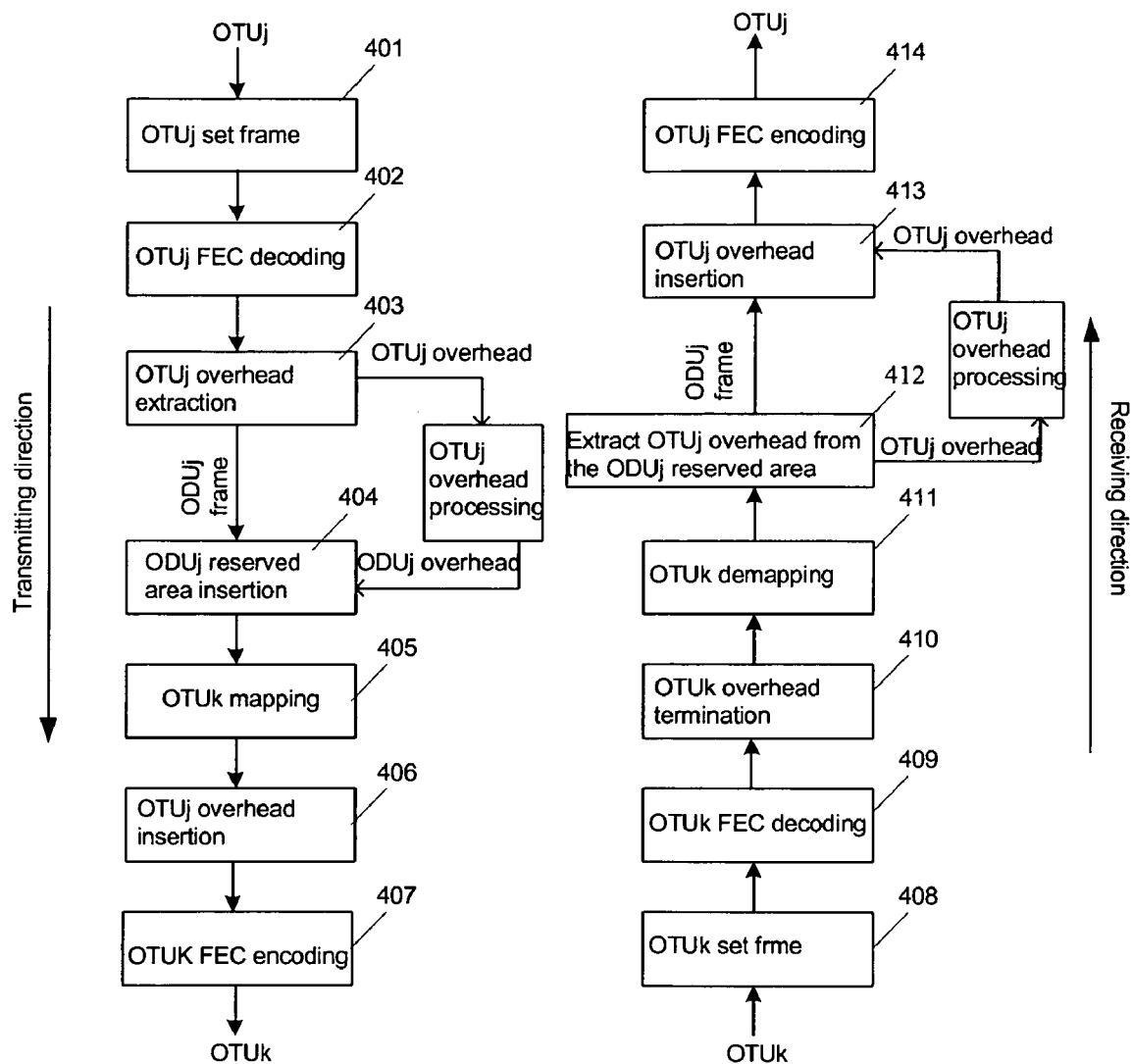
FIG. 4 is a flowchart of transparent transport of OTU signals cross-OTN-administration-domain mentioned in the 2$^{nd}$ working example of the present invention.

The $2^{nd}$ working example is a process procedure of the OTUj signals mapping to the OTUk signals (j=k). FIG. 4 is a flowchart of transparent transport of OTU signals in cross-OTN-administration-domain mentioned in the $2^{nd}$ working example of the present invention. Refer to FIG. 4, because the OTUk control overhead generates and terminates at the location of OTUk formation and stopping position, the OTUk control overhead is used for the segment communication and monitoring process. Therefore, processing OTUk control overhead is needed at the generation and termination position of each OTUk signal.

In the transmitting direction, that is, the administration domain B direction, includes:

In step 401, perform set frame process to the OTUj frame, that is, decide the initial position of the OTUj frame.

In step 402, decode FEC of the OTUj frame, and perform error correction.

In step 403, extract the OTUj control overhead (including GCC0, SM).

Figure 5:
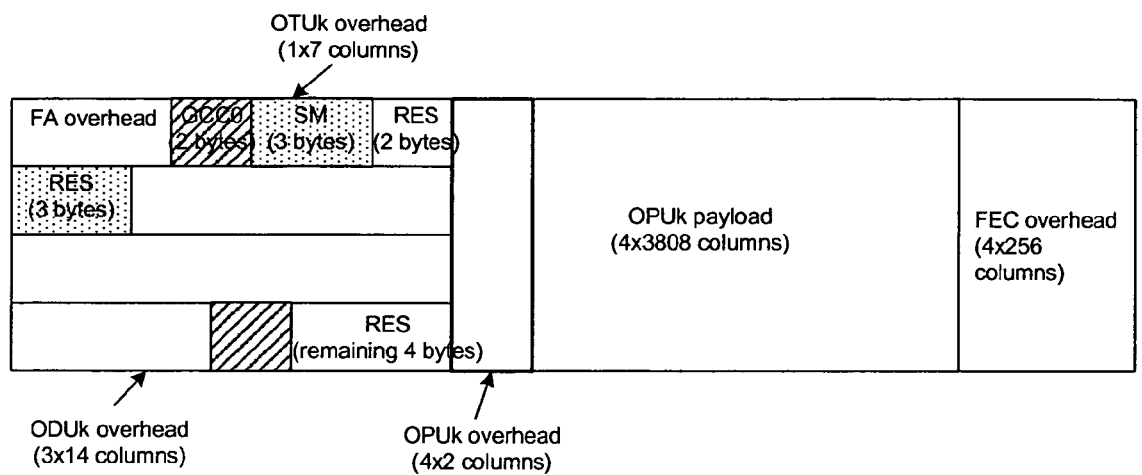
FIG. 5 is a schematic drawing of a mode of unloading an OTUj control overhead mentioned in the present invention.

The preserved overhead of the ODUj overhead area takes 9 bytes, which can use 5 bytes of area carrying 5 OAM&P overhead information of the OTUj therein. For example, it is possible to define an overhead unloading method as shown in FIG. 5. Namely, use 3 reserved bytes of the $2^{nd}$ row, the $1^{st}$~$3^{rd}$ column of the ODUj overhead area for carrying the OTUj SM overhead, use 2 reserved bytes of the $4^{th}$ row, the $9^{th}$~$10^{th}$ column of the ODUj overhead area for carrying the OTUj GCC0 overhead, and the remaining 4 reserved overhead area can be used for other usage. It is also possible to utilize other reserved overhead area for carrying the OTUj control overhead, namely the OAM&P overhead.

The aforementioned extracted OTUj control overhead can be sent to an external unit for carrying out OTUj control overhead processing via the overhead interface, including bit wide conversion buffer memory processing of the overhead data, and the aforementioned processing can be realized by hardware logic. Then insert the buffered OTUj control overhead to these 5 prescribed reserved overhead byte area, and the reserved location of the ODUj overhead area will carry the OAM&P overhead of the OTUj.

In step 405, map the ODUj frame to the OTUk frame.

In step 406, generate OTUk control overhead for the OTUk frame.

In step 407, generate the FEC code in OTUk layer for the OTUk frame, and finally assemble the OTUk frame.

After undergoing the aforementioned process, the OTUj frame might be mapped to the OTUk frame with the same speed to be transported in the administration domain B.

In the receiving direction, that is, the direction of the administration domain B, the method of demapping the aforementioned OTUk frame to an OTUj frame is:

In step 408, set frame for the OTUk frame.

In step 409, decode FEC of the OTUk frame, and perform error correction.

In step 410, terminate the OTUk control overhead, that is, extract and process the OTUk control overhead from the OTUk frame.

In step 411, demap the OTUk signals, and set frame for OTUj.

In step 412, extract the OTUj control overhead from the aforementioned ODUj overhead reserved area.

In step 413, insert the extracted OTUj control overhead to the OTUj control overhead area of the OTUj frame.

The aforementioned extracted OTUj control overhead can be sent to an external unit for performing OTUj control overhead processing via an overhead interface, including bit wide conversion and buffer memory processing of the overhead data, and the aforementioned processing can be realized by hardware logic. Then insert the buffered OTUj control overhead into the OTUj control overhead area of the OTUj frame.

In step 414, generate a FEC code for the OTUj frame, add it to the corresponding area and form a complete OTUj frame structure, and transport to the administration domain A.

With the aforementioned process, transparent transport of uniform rate OTUj frame of the administration domain A via the administration domain B can be realized, which is capable of transparent transport of the OTUj control overhead and the payload portion.

Figure 6:
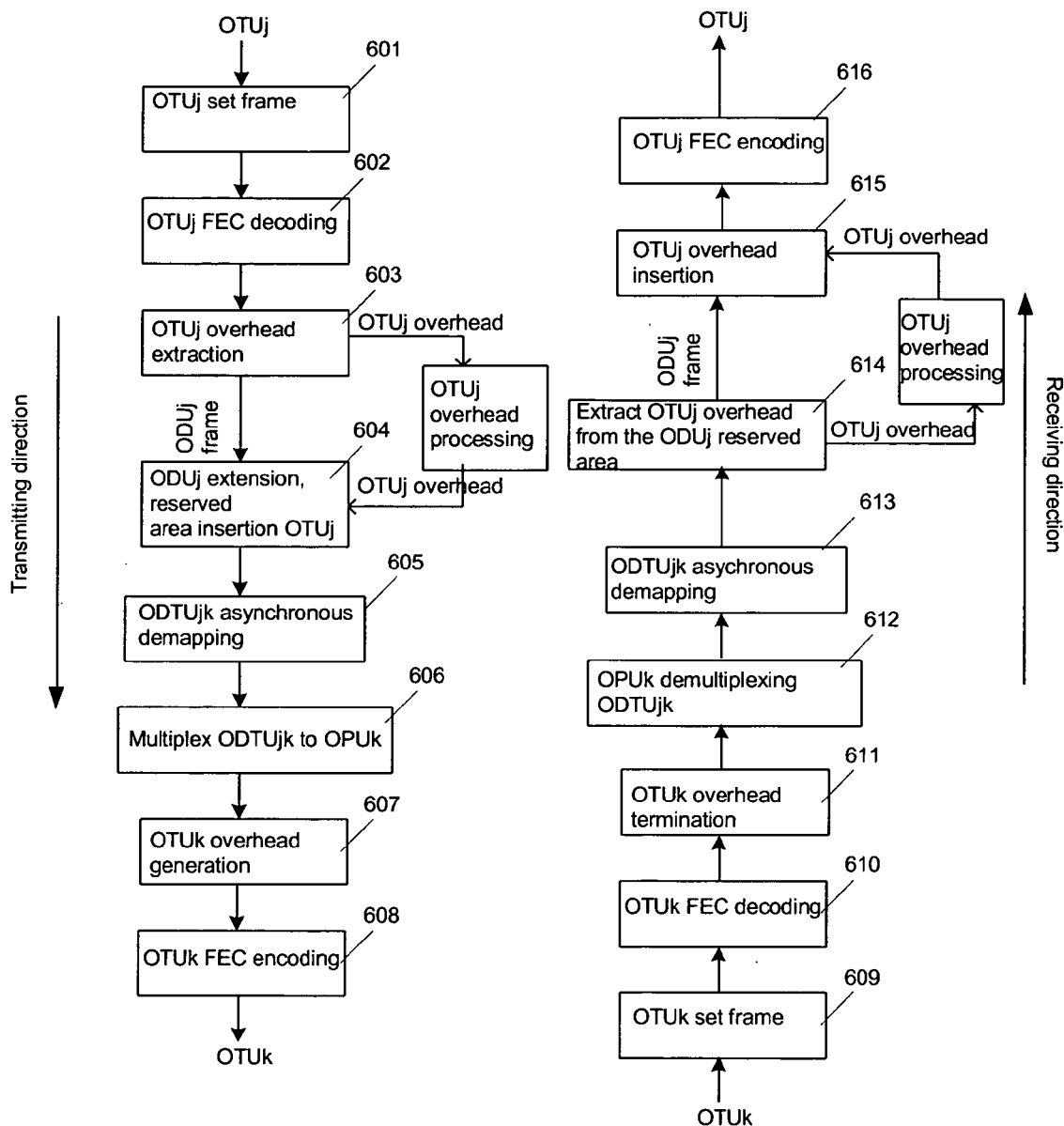
FIG. 6 is a flowchart of transparent transport of OTU signals cross-OTN-administration-domain mentioned in the 3$^{rd}$ working example of the present invention.

The $3^{rd}$ working example presents another process procedure for multiplexing OTUj frames to an OTUk frame (j<k). This process procedure is similar to the $2^{nd}$ working example, which also adopts the reserved overhead area of the branch ODUj signal for carrying the OTUj control overhead. FIG. 6 is a flowchart of transparent transport of OTU signals cross-OTN-administration-domain mentioned in the $3^{rd}$ working example of the present invention. Refer to FIG. 6, the flow includes:

In the transmitting direction, that is, the direction that an OTUj frame entering the administration domain B, includes:

In step 601, set frame for the low rate frames, namely the OTUj frames. That is, decide the initial position of the OTUj frame.

In step 602, decode FEC of the OTUj frame, and perform error correction.

In step 603, extract the OTUj control overhead (including GCC0, SM).

In step 604, extend the ODUj signals. The aforementioned extension operation includes the processing of adding a FA overhead, the process of performing fixed stuffing of the OTUj control overhead area, and inserting the extracted OTUj control overhead to the reserved position of the ODUj overhead area.

The aforementioned extracted OTUj control overhead can be sent to an external unit via an overhead interface for processing the OTUj control overhead, including the conversion of bit wide, buffer memory process of the overhead data, and the aforementioned process can be realized by hardware logic. Then, insert the buffered OTUj control overhead into these 5 reserved overhead byte location for the ODUj overhead, and the reserved location of the ODUj overhead area carries the OAM&P overhead for OTUj.

In step 605, asynchronously map the extended ODUj signals to the optical channel data branch unit (ODTUjk) signals, for adaptation of the frequency differences of the different administration domains, so that the ODTUjk branch signals synchronize with the OTUk signal clock in the administration domain B.

In step 606, multiplex multiple ODTUjk branch signals to the OPUk payload area of the OTUk frame.

In step 607, generate an OTUk control overhead for the OTUk frame.

In step 608, generate a FEC code in the OTUk layer for the OTUk frame, and finally assemble an OTUk frame.

After undergoing the aforementioned process, multiple low speed OTUj frames can be mapped to a high speed OTUk frame for transparent transport in the administration domain B.

In the receiving direction, that is, the direction of the administration domain B, the method for demapping the aforementioned OTUk frame to an OTUj frame is:

In step 609, set frame for the OTUk frame.

In step 610, decode FEC of the OTUk frame, and perform error correction.

In step 611, terminate the OTUk control overhead, that is, extract and process the OTUk control overhead.

In step 612, demultiplex of the OPUk payload area of the OTUk frame, and obtain multiple ODTUjk branch signals In step 613, asynchronously demap the ODTUjk branch signals, respectively, obtain the ODUj signals by synchronizing the OTUj signal of the administration domain A, and set an OTUj frame.

In step 614, extract the OTUj control overhead from the aforementioned ODUj overhead reserved area.

In step 615, insert the extracted content to the OTUj control overhead area of the OTUj frame.

The aforementioned extracted OTUj control overhead can be sent to an external unit for performing OTUj control overhead process via an overhead interface, including bit wide conversion and buffer memory processing of the overhead data, and the aforementioned process can be realized by hardware logic. Then insert the buffered OTUj control overhead into the OTUj control overhead area of the OTUj frame.

In step 616, generate a FEC code for the OTUj frame, add it to the corresponding area and form a complete OTUj frame structure, and transport to the administration domain A.

With the aforementioned process, transparent transport of low speed OTUj frames of the administration domain A via the administration domain B can be achieved, which enables transparent transport of the OTUj control overhead and the payload portion.

Figure 7:
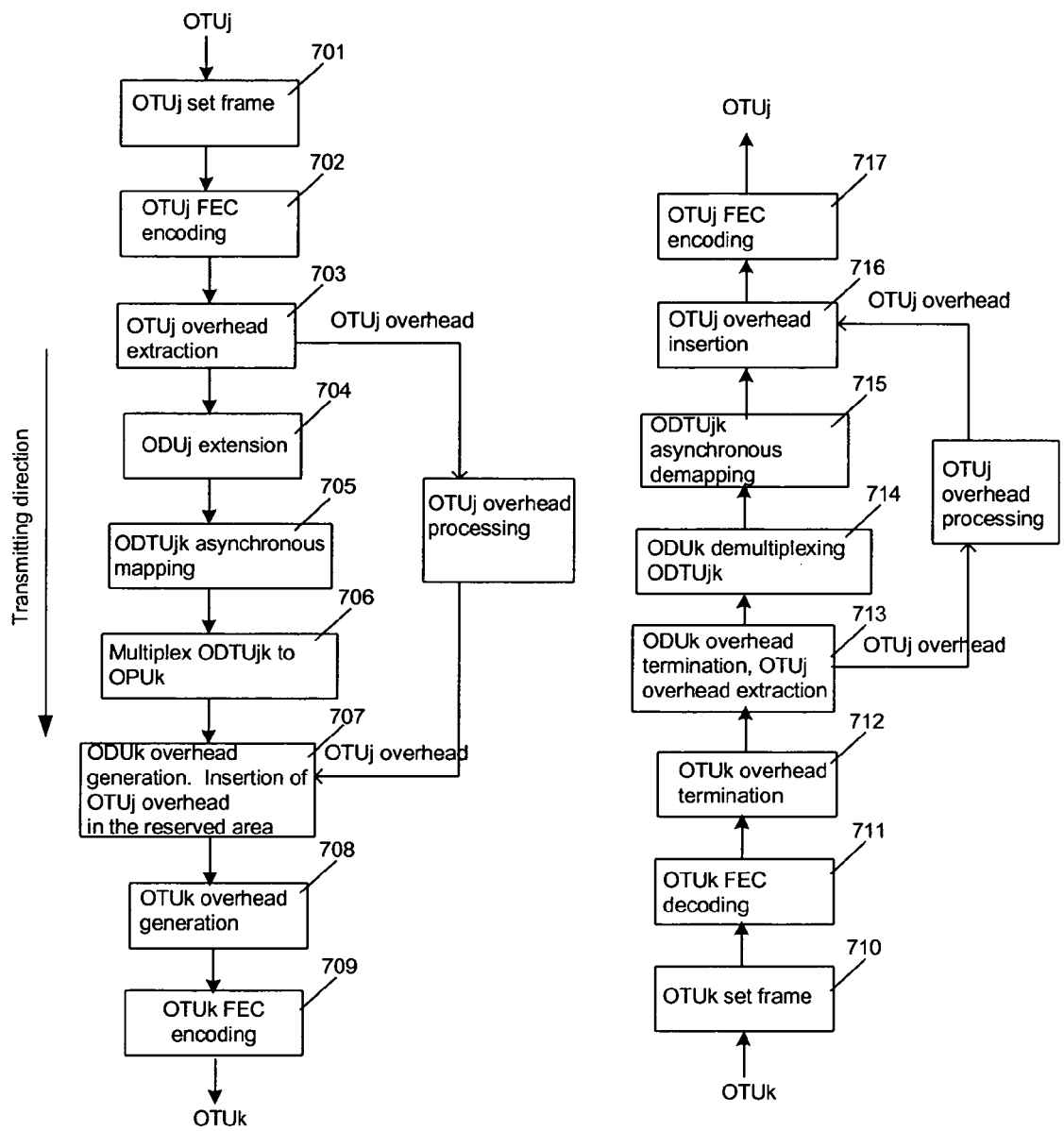
FIG. 7 is a flowchart of transparent transport of OTU signals cross-OTN-administration-domain mentioned in the 4$^{th}$ working example of the present invention.

The $4^{th}$ working example is another process procedure of multiplexing OTUj frames to an OTUk frame (j<k), using the reserved area for the network ODUk overhead to carry the branch OTUj control overhead. Based on the OTN standard, the OTUk unit bit rate is at least [k/j] times greater than the OTUj bit rate (for example, in the scenario of multiplexing OTU1 to ODU2, the OTU1 bit rate is 2.67 Gbps, and the OTU2 bit rate is 10.7 Gbps), the equivalent amount of ODUk overhead bandwidth is sufficient for carrying a number of [k/j] OTUj control overheads. The overhead distribution adopted in this working example is similar with that of FIG. 5. That is, use 5 ODUk reserved overhead bytes carrying 5 control overhead bytes of a number of [k/j] OTUj control overheads, and adopt OTN defined multiframe (MFAS: Multiframe Alignment Signal) values to distinguish the current ODUk preserved overhead carrying the control overhead of which branch OTUj. FIG. 7 is a flowchart of the OTUk transparent transport of the OTUj control overhead mentioned in the $4^{th}$ working example. See FIG. 7, the flow includes:

In the transmitting direction, that is, the direction that an OTUj frame entering the administration domain B, includes:

In step 701, set frame for low speed frames, that is, decide the initial position of the OTUj frame.

In step 702, decode FEC of the OTUj frame, and perform error correction.

In step 703, extract the OTUj overhead (including GCC0, SM).

The aforementioned extracted OTUj control overhead can be sent to an external unit via an overhead interface for processing the OTUj control overhead, including the conversion of bit wide, buffer memory process of the overhead data, and rate adaptation process. Then place it in the external buffer and insert the buffered OTUj control overhead into these 5 reserved overhead byte area for the ODUj overhead, and the reserved location of the ODUj overhead area carries the OAM&P overhead for OTUj.

In step 704, extend the ODUj signals. The aforementioned extension operation includes the processing of adding a FA overhead, the process of performing fixed stuffing of the OTUj control overhead area;

In step 705, asynchronously map the extended ODUj signals to the optical channel data branch unit (ODTUjk) signals, for adaptation of the frequency differences of different administration domains, so that the ODTUjk branch signals synchronize with the OTUk signal clock in the administration domain B.

In step 706, multiplex multiple ODTUjk branch signals to the OPUk payload area of the OTUk frame.

In step 707, generate an ODUk overhead, and insert the branch OTUj overhead extracted in step 703 in the ODUk defined reserved overhead area, only 5 ODUk reserved overhead bytes are needed for carrying the multiplexed branch OTUj control overhead with the multiframe mode, and the overhead multiplexing method is: multiframe the corresponding bit value to indicate carrying which of the branch OTUj control overheads; for example, when multiplexing 4 OTU1 to OTU2, it may define the OTU 2 Multiframe Alignment Signal (MFAS) bit [78] value as 00~11, that carry the $1^{st}$~$4^{th}$ OTU1 control overheads, respectively.

In step 708, generate an OTUk overhead;

In step 709, generate a FEC code in the OTUk layer for the OTUk frame, and finally assemble an OTUk frame.

After undergoing the aforementioned process, multiple low speed OTUj frames can be mapped to a high speed OTUk frame for transparent transport in the administration domain B.

In the receiving direction, that is the direction of the administration domain B, the method of multiplexing the aforementioned OTUk frame to an OTUj frame is:

In step 710, set frame for the OTUk frame.

In step 711, decode FEC of the OTUk frame, and perform error correction.

In step 712, terminate the OTUk control overhead, that is, extract and process the OTUk control overhead.

In step 713, demultiplex the ODUk overhead, and extract the OTUj control overhead from the aforementioned reserved overhead area. The aforementioned extracted OTUj control overhead can be sent to an external unit for performing OTUj control overhead processing via an overhead interface, including bit wide conversion, buffer the overhead data, and rate adaptation processing, etc.

In step 714, demultiplex the OPUk payload area of the OTUk frame, and obtain multiple ODTUjk branch signals.

In step 715, asynchronously demap the ODUTjk branch signals, and obtain the ODUj signals synchronized with the OTUj signal clock in the administration domain A.

In step 716, insert the OTUj control overhead extracted in step 713 into the OTUj control overhead area of the OTUj frame.

In step 717, generate a FEC code for the OTUj frame, and finally assemble the OTUj frame and transport to the administration domain A.

After undergoing the aforementioned process, transparent transport of low speed OTUj frame in the administration domain via the administration domain B can be accomplished. That is, it enables transparent transport of the OTUj control overhead and the payload portion.

The present invention also discloses a system for transparent transport OTU signals via the OTN. This system, corresponding to the $1^{st}$ working example of the aforementioned method, is used to execute the steps in the aforementioned $1^{st}$ working example, including the transmitting unit and receiving unit set at the OTN network boundary, where:

The transmitting unit, which executes the processing steps in the transmitting direction in the aforementioned method, is used for mapping and converting the OTUj signals entering the OTN network into OTUk signals of the current OTN network for transmission, and in the mean time, preserving the original OTUj control overhead of the aforementioned OTUj signals.

The receiving unit, which executes the process steps of the receiving direction in the aforementioned method, is used for receiving the OTUk signals arriving at the OTN network boundary, demapping and converting to the OTUj signals, and successively using the aforementioned preserved OTUj control overhead value as the OTUj control overhead of the OTUj signals, and transmitting the OTUj signals out of the current OTN network.

The aforementioned j and k represent the rate rank of the aforementioned OTU signals, and j is smaller than k.

Figure 8:
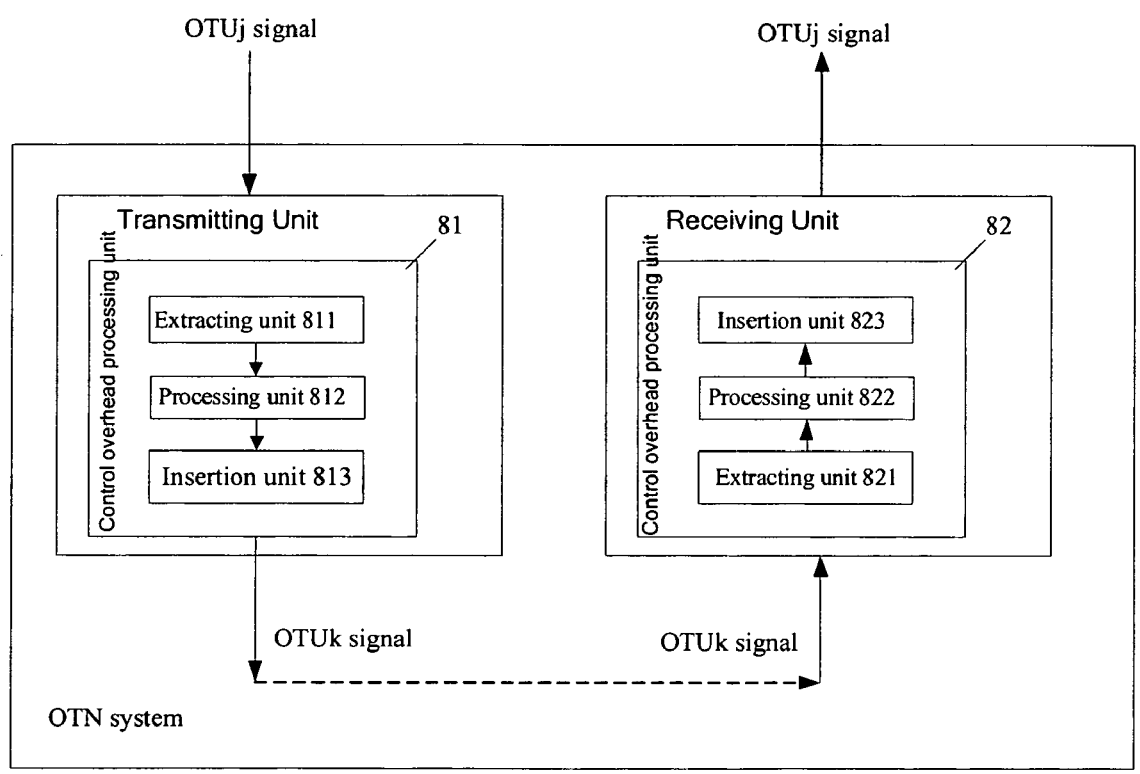
FIG. 8 is a system configuration diagram of transparent transport of OTU signals via an OTN mentioned in the present invention.

The present invention also discloses a system for transparent transport OTU signals via the OTN. This system, which is in correspondence with the aforementioned method in the $2^{nd}$, $3^{rd}$, and $4^{th}$ working examples, is used for execute the operation steps of the aforementioned working examples. See FIG. 8, this system includes a transmitting unit and a receiving unit set at the OTN network boundary:

The transmitting unit, which corresponds with the processing steps of the transmitting direction in the aforementioned method, is used for mapping and converting the OTUj signals entering the OTN network into the OTUk signals of the OTN network for transmitting, which includes a control overhead processing unit 81, that is used for extracting the OTUj control overhead of the aforementioned OTUj signals, and transferring to the reserved overhead location;

The receiving unit, which executes the process steps of the receiving direction in the aforementioned method, is used for receiving the OTUk signals arriving at the OTN network boundary, demapping and converting to OTUj signals, and transporting out of the current OTN network. It includes a control overhead processing unit 82, which is used for extracting the OTUj control overhead from the aforementioned reserved overhead position, which will be used as the OTUj control overhead of the OTUj signals;

The aforementioned j and k represent the OTU signal rate, respectively.

The control overhead processing unit 81 in the aforementioned transmitting unit includes:

An extract unit 811, which is used for extracting the OTUj control overhead from the OTUj signals, entering the aforementioned OTN network.

A process unit 812, which is used for overhead processing of the extracted OTUj control overhead, for example, includes the process of bit wide conversion, overhead data buffering, and rate adaptation, etc.

An insertion unit 823 is used for inserting the overhead processed OTUj control overhead into the OTUj control overhead area of the OTUj signals.

In the aforementioned system, when the above j is smaller than k, the aforementioned reserved overhead location is: the reserved location for the ODUj overhead of the aforementioned OTUj signals; or the reserved location for the ODUk overhead of the aforementioned OTUk signals. When the above j is equal to k, the aforementioned reserved overhead location is: the reserved location for the ODUj overhead of the aforementioned OTUj signals.

The aforementioned OTUj control overhead is an OAM&P overhead, which includes the GCC0 overhead and SM overhead.

In conclusion, while the presently preferred embodiment of the present invention has been shown and described, it is to be understood that this disclosure is for the purpose of illustration and that various changes and modifications may be made without departing from the scope of the invention as set forth in the appended claims, by people in the art. Therefore, the scope of protection of the present invention should be subject to the scope of protection of the claim.

What is claimed is:

1. A method for transparent transport of optical channel transmission unit (OTU) signals via an optical transport network (OTN), the method comprising:
   reserving an OTUj control overhead of OTUj signals entering an OTN network;
   converting said OTUj signals mapping into OTUk signals of the current OTN network for transmission, when said OTUk signals arriving at a boundary of the current OTN network, wherein said converting of said OTUj signals mapping into OTUk signals of the current OTN network for transmission includes:
      extending an ODUj signal of OTUj signals,
      extending the reserved OTUj overhead as a part of the ODUj signal,
      asynchronously mapping the extended ODUj signal to optical channel data branch unit signals,
      multiplexing the multiple optical channel data branch unit signals to a payload area,
      generating an OTUk control overhead and an OTUk forward error correction (FEC) code, and
      assembling said OTUk signals;
   demapping said OTUk signals and converting them to the OTUj signals;
   continuously using said reserved OTUj control overhead as the OTUj control overhead for OTUj signals; and
   sending out OTUj signals from the OTN network, wherein j and k represent a rate rank of said OTN signals, respectively, and the value of j is smaller than the value of k.

2. The method according to claim 1, wherein said OTUj control overhead is an Operation/Administration/Maintenance and Provision (OAM&P) overhead, including a Generic Communication Channel (GCC0) overhead and a Section Monitoring (SM) overhead.

3. A system of transparent transport of optical channel transmission unit (OTU) signals via an optical transport network (OTN), the system comprising:
   a transmitting unit configured for:
      converting OTUj signals mapping entering the OTN network into OTUk signals of the current OTN network for transmission, wherein said converting of said OTUj signals mapping into OTUk signals of the current OTN network for transmission includes:
         extending an ODUj signal of OTUj signals,
         extending the reserved OTUj overhead as a part of the ODUj signal,
         asynchronously mapping the extended ODUj signal to optical channel data branch unit signals,
         multiplexing the multiple optical channel data branch unit signals to a payload area,
         generating an OTUk control overhead and an OTUk forward error correction (FEC) code, and
         assembling said OTUk signals, and
      reserving the original OTUj control overhead of said OTUj signals;
   a receiving unit in communication with the transmitting unit, the receiving unit configured for;
      receiving OTUk signals arriving in an OTN network boundary,
      demapping and converting OTUk signals to OTUj signals;
      successively using said reserved OTUj control overhead as the OTUj control overhead of OTUj signals, and
      transport said OTUj signals out of the current OTN network;
   wherein said j and k represent a rate rank of said OTU signals, respectively, and the value of j is smaller than the value of k.

4. The system according to claim 3, wherein said OTUj control overhead is an Operation/Administration/Maintenance and Provision (OAM&P) OAM&P overhead, including a Generic Communication Channel (GCC0) overhead and an SM overhead.

5. A method for transparent transport of optical channel transmission unit (OTU) signals via an optical transport network (OTN), the method comprising:
   extracting an OTUj control overhead of OTUj signals entering an OTN network;
   mapping said ODUj signals to OTUk signals of the current OTN network for transport, wherein said mapping of said ODUj signals into said OTUk signals of the current OTN network for transport includes:
      extending an ODUj signal of OTUj signals,
      extending the reserved OTUj overhead as a part of the ODUj signal,
      asynchronously mapping the extended ODUj signal to optical channel data branch unit signals,
      multiplexing the multiple optical channel data branch unit signals to a payload area,
      generating an OTUk control overhead and an OTUk forward error correction (FEC) code, and
   assembling said OTUk signals;
   transferring said OTUj control overhead to a reserved overhead location, when said OTUk signals arriving at a current OTN network boundary;
   demapping said OTUk signals and converting them to said OTUj signals;
   extracting said OTUj control overhead from said reserved overhead location therein for using as the OTUj control overhead of OTUj signals; and
   transmitting OTUj signals out from the current OTN network, wherein the value of j and the value of k represent a rate rank of said OTU signals, respectively.

6. The method according to claim 5, wherein said j is smaller than k, and said reserved overhead location is: the reserved location for the ODUj overhead in said OTUj signals.

7. The method according to claim 5, wherein said j is smaller than k, and said reserved overhead location is: the reserved location for the ODUk overhead of said OTUk signals.

8. The method according to claim 5, wherein said j is equal to k, said reserved overhead location is as follows: the reserved location for ODUj overhead of said OTUj signal.

9. The method according to claim 5, wherein said further overhead processing is performed to the extracted OTUj control overhead, and said processing includes one kind or any combination from a bit wide conversion, a buffering, and a rate adaptation operation.

10. The method according to claim 5, wherein said OTUj control overhead is an Operation/Administration/Maintenance and Provision (OAM&P) overhead, including a Generic Communication Channel (GCC0) overhead and an SM overhead.

11. A system for transparent transport of optical channel transmission unit (OTU) signals via an optical transport network (OTN), the system comprising:
- a transmitting unit configured for:
  - mapping OTUj signals entering the OTN network to OTUk signals of the current OTN network for transmission, including a control overhead processing unit used for extracting an OTUj control overhead of said OTUj signals, wherein said mapping of said ODUj signals into said OTUk signals of the current OTN network for transmission includes:
    - extending an ODUj signal of OTUj signals,
    - extending the reserved OTUj overhead as a part of the ODUj signal,
    - asynchronously mapping the extended ODUj signal to optical channel data branch unit signals,
    - multiplexing the multiple optical channel data branch unit signals to a payload area,
    - generating an OTUk control overhead and an OTUk forward error correction (FEC) code, and
    - assembling said OTUk signals, and
  - transferring that to the reserved overhead location; and
- a receiving unit in communication with the transmitting unit, the receiving unit configured for;
  - receiving OTUk signals arriving at an OTN network boundary, and
  - demapping and converting them into OTUj signals and transporting out of the current OTN network, which includes a control overhead processing unit, used for extracting said OTUj control overhead from said reserved overhead location as the OTUj control overhead of OTUj signals;
- wherein said j and k represent a rate rank of said OTU signals, respectively, and the value of j is smaller than the value of k.

* * * * *